United States Patent
Cheng et al.

(10) Patent No.: US 9,212,817 B2
(45) Date of Patent: Dec. 15, 2015

(54) LOW $NO_x$ BURNER FOR A WATER HEATER (75) Inventors: Yonghua Cheng, Fergus (CA); Liliang Dou, Nanjing (CN); Larry Chanasyk, Fergus (CA); Dayan Bi, Nanjing (CN); Hongfei Ma, Nanjing (CN)

(73) Assignee: A. O. SMITH CORPORATION, Milwaukee, WI (US)

( * ) Notice: Subject to any disclaimer, the term of this patent is extended or adjusted under 35 U.S.C. 154(b) by 209 days.

(21) Appl. No.: 13/988,970

(22) PCT Filed: Dec. 1, 2010

(86) PCT No.: PCT/CN2010/079314
§ 371 (c)(1),
(2), (4) Date: May 22, 2013

(87) PCT Pub. No.: WO2012/071713
PCT Pub. Date: Jun. 7, 2012

(65) Prior Publication Data
US 2013/0247844 A1 Sep. 26, 2013

(51) Int. Cl.
*F23D 14/04* (2006.01)
*F23D 14/10* (2006.01)
(Continued)

(52) U.S. Cl.
CPC .............. *F23D 14/04* (2013.01); *B23P 19/00* (2013.01); *F23D 14/045* (2013.01);
(Continued)

(58) Field of Classification Search
CPC ............ F23D 14/04; F24H 1/10; B23P 19/00
USPC ........................... 431/129, 354, 285, 154, 278
See application file for complete search history.

(56) References Cited

U.S. PATENT DOCUMENTS

| 4,450,704 A | * | 5/1984 | Schaeffler et al. ............... 72/356 |
| 5,525,054 A | | 6/1996 | Nakaura et al. |

(Continued)

FOREIGN PATENT DOCUMENTS

| CN | 2076201 U | 5/1991 |
| CN | 2246751 Y | 2/1997 |

(Continued)

OTHER PUBLICATIONS

First Office Action from the State Intellectual Property Office of China for Application No. 201080070477.7 dated Feb. 16, 2015 (with English translation 15 pages).

(Continued)

*Primary Examiner* — Gregory Huson
*Assistant Examiner* — Nikhil Mashruwala
(74) *Attorney, Agent, or Firm* — Michael Best & Friedrich LLP (57) ABSTRACT

A method of assembling multiple low $NO_x$ burners (100), a low $NO_x$ burners (100) and a tankless gas-fired water heater (500) are disclosed. The method includes the step of assembling multiple bodies (152), each body (152) includes multiple first burner ports (135) connected to a first burner inlet (125) and multiple second burner ports (150) connected to a second burner inlet (140). The method also includes the step of selecting one of the bodies (152) and inserting a first inlet tube (120, 220, 320, 420) into the second burner inlet (140) to provide a fuel/air mixture to the second burner ports (150) at a first rate. The method also includes the step of selecting one of the bodies (152) and inserting a second inlet tube (120, 220, 320, 420) into the second burner inlet (140) to provide the fuel/air mixture to the second burner ports (150) at a second rate different from the first rate.

4 Claims, 7 Drawing Sheets

(51) Int. Cl.
  *F23D 14/48* (2006.01)
  *F23D 14/64* (2006.01)
  *B23P 19/00* (2006.01)
  *F24H 1/10* (2006.01)
  *F24H 9/18* (2006.01)
  *F24H 1/14* (2006.01)

(52) U.S. Cl.
  CPC ............. *F23D 14/105* (2013.01); *F23D 14/48* (2013.01); *F23D 14/64* (2013.01); *F24H 1/107* (2013.01); *F24H 1/145* (2013.01); *F24H 9/1836* (2013.01); *Y10T 29/49348* (2015.01)

(56) References Cited

U.S. PATENT DOCUMENTS

| | | | |
|---|---|---|---|
| 6,746,236 B2 * | 6/2004 | Kuriyama et al. | 431/354 |
| 6,758,208 B2 * | 7/2004 | Gierula et al. | 126/116 A |
| 7,028,918 B2 * | 4/2006 | Buchanan et al. | 239/132.3 |
| 9,033,702 B2 * | 5/2015 | Min et al. | 431/355 |
| 2003/0096205 A1 | 5/2003 | Vecchi et al. | |
| 2015/0184849 A1 * | 7/2015 | Akagi et al. | |

FOREIGN PATENT DOCUMENTS

| | | |
|---|---|---|
| CN | 2881364 Y | 3/2007 |
| CN | 201348376 | 11/2009 |
| CN | 201436472 | 4/2010 |
| CN | 201436507 | 4/2010 |
| EP | 0587456 | 11/1997 |
| JP | 2004053117 | 2/2004 |
| JP | H2004053117 | 2/2004 |
| WO | 01/57437 | 8/2001 |

OTHER PUBLICATIONS

International Search Report and Written Opinion of the International Searching Authority, International Patent Application No. PCT/CN2010/079314, mailed Sep. 8, 2011.

\* cited by examiner

LOW NO$_x$ BURNER FOR A WATER HEATER

BACKGROUND

The present invention relates to water heaters, and more particularly to a low NO$_x$ burner for a water heater.

Nitrogen oxides (NO$_x$) are formed during combustion. NO$_x$ is typically generated by high temperature flames. A low NO$_x$ burner reduces the amount of NO$_x$ formed during combustion. A lean-rich dual burner assembly combusts a fuel-lean fuel/air mixture with a lean burner and combusts a fuel-rich fuel/air mixture with a rich burner. A lean-rich dual burner assembly reduces NO$_x$ by decreasing flame temperature.

SUMMARY

The present invention provides, in one aspect, a method of assembling multiple low NO$_x$ burners. The method including the step of assembling multiple bodies, each body including a multiple first burner ports connected to a first burner inlet and multiple second burner ports connected to a second burner inlet. The method also including the step of selecting one of the bodies and inserting a first inlet tube into the second burner inlet to provide a fuel/air mixture to the second burner ports at a first rate. The method also including the step of selecting one of the bodies and inserting a second inlet tube into the second burner inlet to provide the fuel/air mixture to the second burner ports at a second rate different than the first rate.

The present invention provides, in another aspect, a low NO$_x$ burner including a body including multiple first burner ports connected to a first burner inlet and multiple second burner ports connected to a second burner inlet and a removable inlet tube positioned in the second burner inlet to provide a fuel/air mixture to the second burner ports.

The present invention provides, in another aspect, a tankless gas-fired water heater including a burner, a heat exchanger, and a water conduit. The burner includes a body with an inner burner having a first burner inlet and an outer burner having a second burner inlet and a removable inlet tube positioned in one of the first burner inlet and the second burner inlet. The removable inlet tube has an arrangement of openings to provide a desired fuel/air mixture to the respective inner burner and outer burner. The burner has an input of greater than 199,000 BTU per hour and is operable to generate products of combustion having desired characteristics resulting at least in part from the removable inlet tube utilized. The heat exchanger receives the products of combustion from the burner. The water conduit is positioned in the heat exchanger in a heat exchange relationship with the products of combustion.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
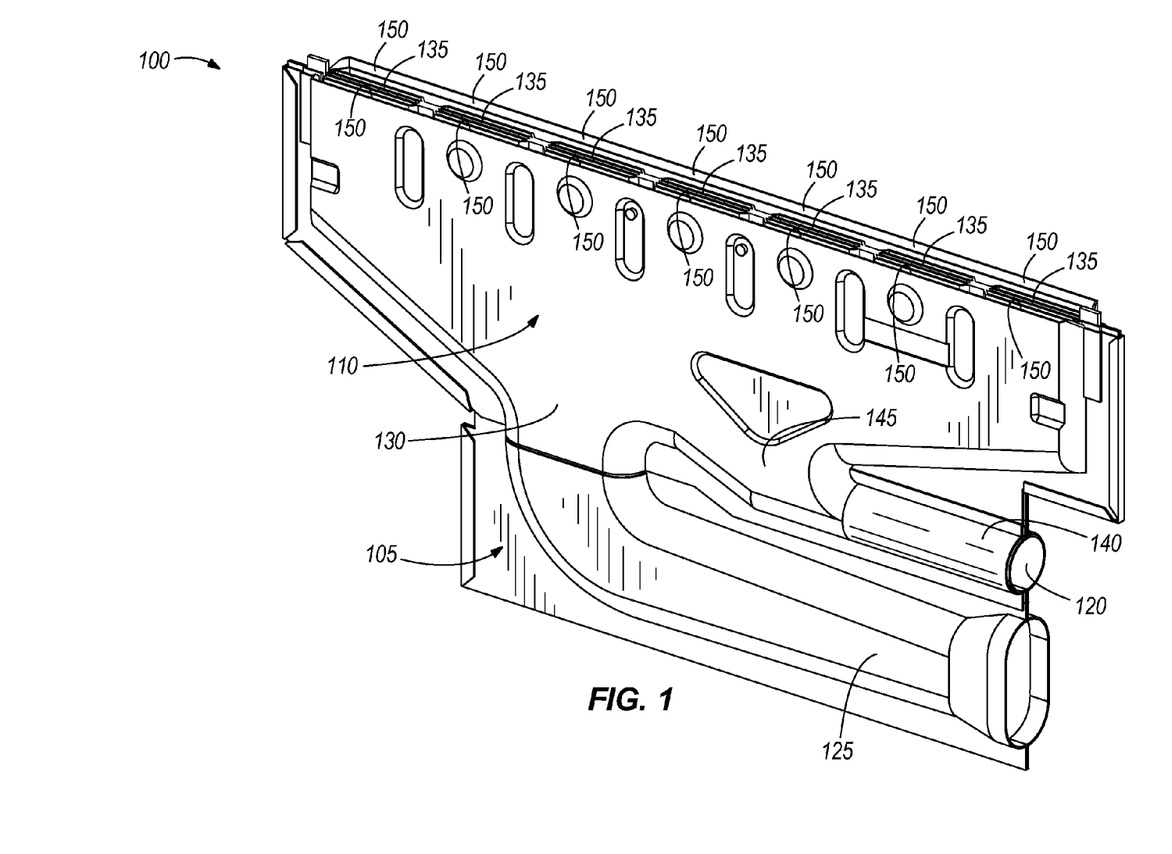
FIG. 1 is a perspective view of a low NO$_x$ burner.
Figure 2:
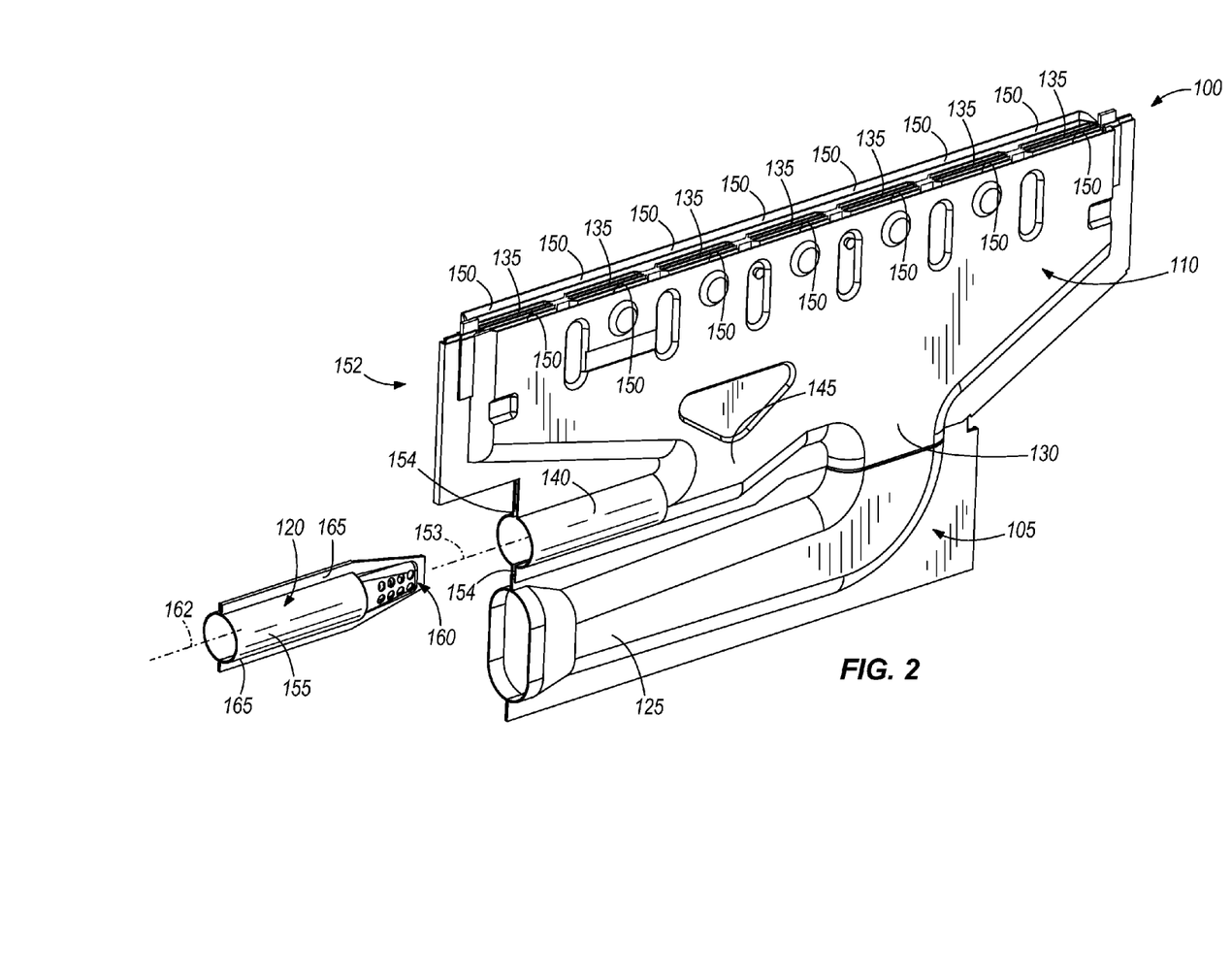
FIG. 2 is a partially exploded view of the low NO$_x$ burner of FIG. 1.
Figure 3:
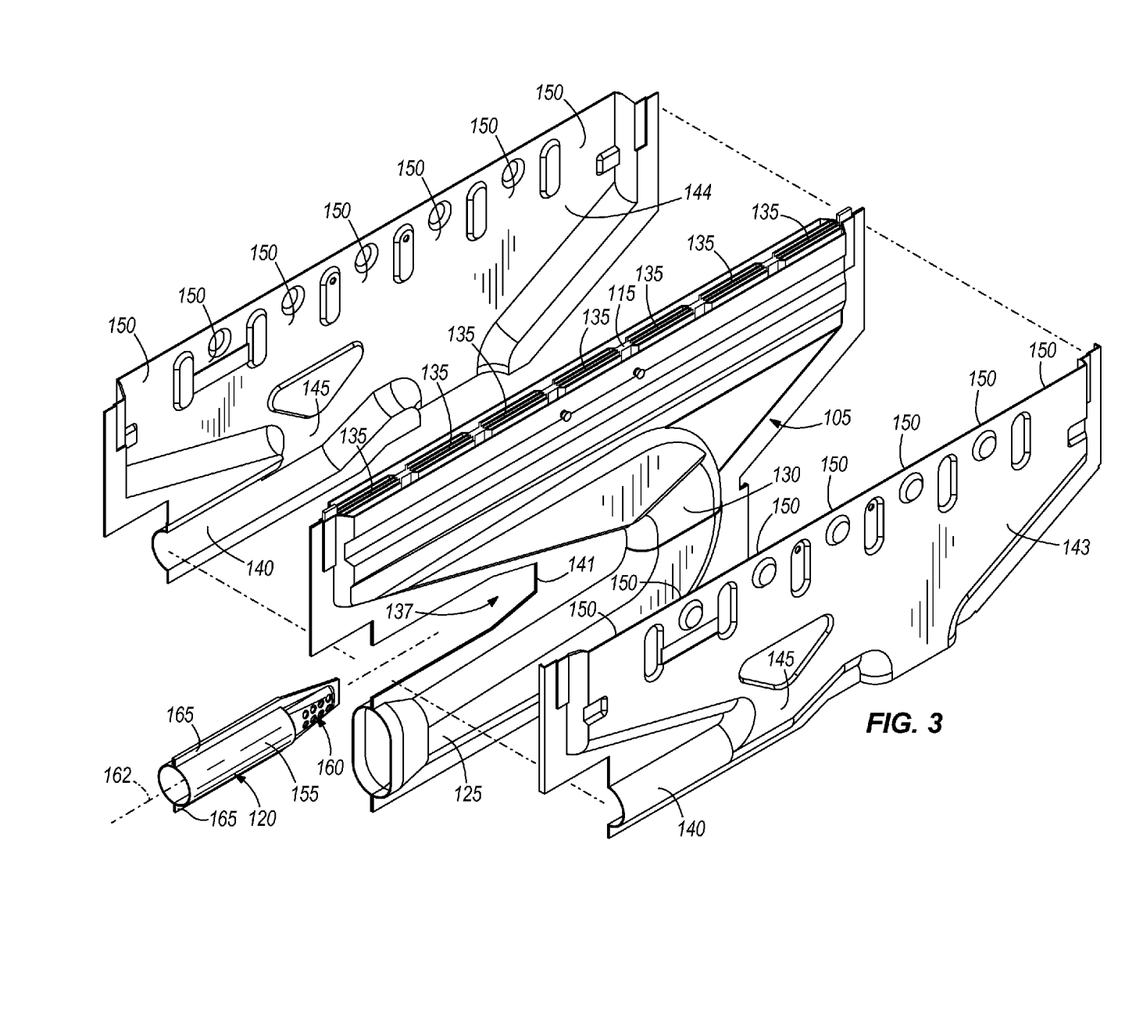
FIG. 3 is a partially exploded view of the low NO$_x$ burner of FIG. 1.

A low NO$_x$ burner 100 for a water heater is shown in FIG. 1. The low NO$_x$ burner 100 includes an inner burner 105, an outer burner 110, a burner port plate 115, and an inlet tube 120. As shown in FIG. 3, the inner burner 105 is formed from a single plate, with the edges of the plate mechanically secured to one another to create an opening at the upper portion of the inner burner 105. The burner port plate 115 is positioned within this opening. The inner burner 105 includes an inlet 125 fluidly connected by a flow path 130 to a series of inner burner ports 135 formed in the burner port plate 115. The inner burner 105 also includes a channel 137 that is aligned with an inlet 140 of the outer burner 110. The channel 137 includes a stop 141 at the distal end of the channel 137. The outer burner 110 is formed by two plates 143 and 144 mechanically secured together to surround the periphery of an upper portion of the inner burner 105 and create a series of outer burner ports 150 between the upper portion of the inner burner 105 and the outer burner 110. The inlet 140 of the outer burner 110 is fluidly connected by a flow path 145 to the outer burner ports 150. As shown in FIG. 2, the inlet 140 includes a longitudinal axis 153 and a pair of locating slots 154. The slots 154 define a vertical plane that includes the longitudinal axis 153. As best shown in FIG. 3, the outer burner ports 150 are formed between each of the plates 143 and 144 and the inner burner 105 so that the inner burner ports 135 are sandwiched between the outer burner ports 150 formed between the plate 143 and the inner burner 105 and the outer burner ports 150 formed between the plate 144 and the inner burner 105. As such, the outer burner ports 150 are considered to be positioned to the outside of the inner burner ports 135.

Figure 4:
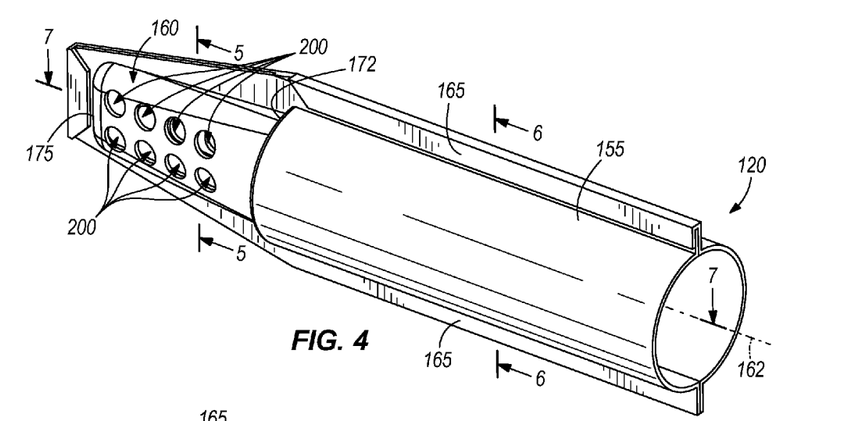
FIG. 4 is a perspective view of an inlet tube for use with the low NO$_x$ burner of FIG. 1.
Figures 5, 6, 7:
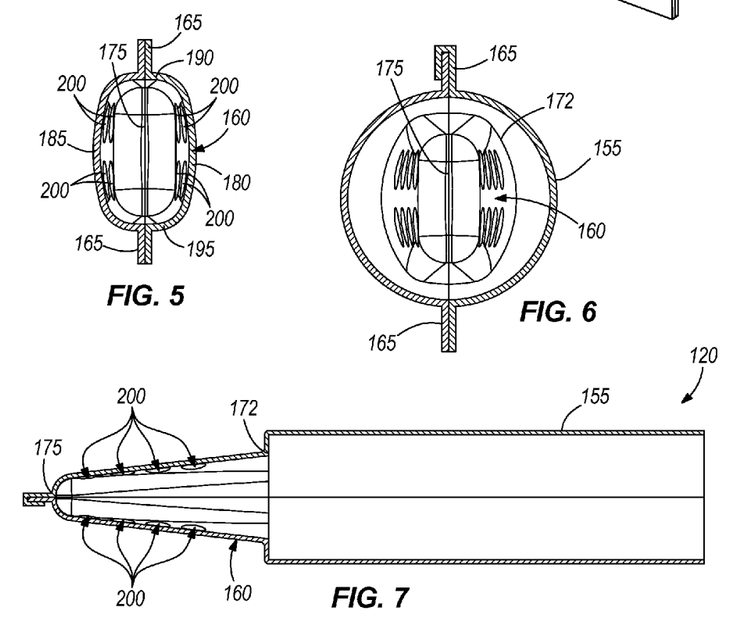
FIG. 5 is a section view of the inlet tube of FIG. 4 along line 5-5.
FIG. 6 is a section view of the inlet tube of FIG. 4 along line 6-6.
FIG. 7 is a section view of the inlet tube of FIG. 4 along line 7-7.
Figure 8:
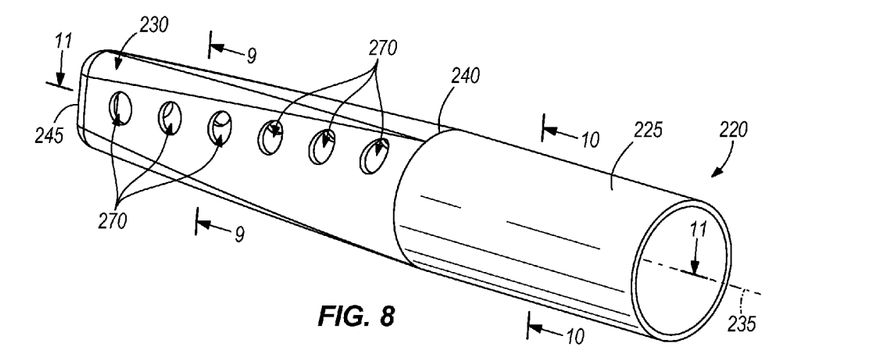
FIG. 8 is a perspective view of a second embodiment of an inlet tube for use with the low NO$_x$ burner of FIG. 1.

As shown in FIGS. 2 and 3, the inlet tube 120 is positionable in and removable from a body 152 of the low $NO_x$ burner 100. The body 152 includes all of the components of the low $NO_x$ burner 100 except for the inlet tube 120. The inlet tube 120 is received by the inlet 140. As shown in FIGS. 4-7, the inlet tube 120 includes a cylindrical portion 155, a tip 160 at one end of the cylindrical portion 155, and a longitudinal axis 162. The end of the cylindrical portion 155 opposite the tip 160 is open to receive a fuel/air mixture. The inlet tube 120 also includes two locating flanges 165. The flanges 165 define a vertical plane that includes the longitudinal axis 162. Alternatively, the inlet tube 120 could include no locating flanges 165, a single locating flange 165, or more than two locating flanges 165. The tip 160 narrows from a proximal end 172 adjacent to the cylindrical portion 155 to a distal end 175. The tip 160 is shorter than the cylindrical portion 155 when measured along the longitudinal axis 162. The distal end 175 is closed so that the fuel/air mixture flowing through the inlet tube 120 does not exit the inlet tube 120 in a direction parallel to the longitudinal axis 162. As shown in FIG. 6, the cylindrical portion 155 has a circular cross section. As shown in FIG. 5, the tip 160 has a non-circular cross section that is defined by two curved long sides 180 and 185 and two curved short sides 190 and 195. The cross-sectional area of the tip 160 decreases in size from the proximal end 172 to the distal end 175. Eight openings 200 are formed through the long side 180 and eight openings 200 are formed through the long side 185. The eight openings 200 through each long side 180 and 185 are positioned in two rows of four. Each row is positioned along a line defined by the center points of the openings 200. Each of these lines is included in a plane that is parallel to the longitudinal axis 162. The size, shape, positioning, and number of the openings 200 can vary. The fuel/air mixture flowing through the inlet tube 120 exits through the openings 200. The openings 200 are illustrated as circular holes but can be of any desired shape, including, but not limited to, non-circular holes and elongated slots.

The inlet tube 120 is inserted in the inlet 140 to position the inlet tube 120 such that the longitudinal axis 162 of the inlet tube 120 is collinear with the longitudinal axis 153 of the inlet 140. Each flange 165 is received by a corresponding slot 154 to rotationally position the inlet tube 120 about the longitudinal axis 153. This rotational positioning can be accomplished with more or fewer flanges 165 than the two illustrated flanges 165. More or fewer locating slots 154 are formed in the inlet 140 as needed. The channel 137 of the inner burner 105 includes a stop 141 that engages the distal end 175 of the tip 160 to position the inlet tube 120 longitudinally within the inlet 140. The perimeter of the channel 137 is shaped substantially identically to the cross section of the inlet tube 120 through the vertical plane including the longitudinal axis 162.

Figure 9:
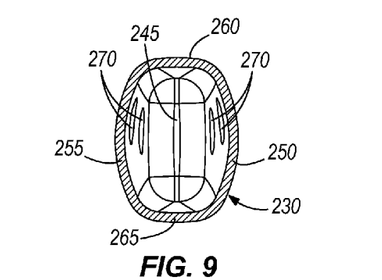
FIG. 9 is a section view of the inlet tube of FIG. 8 along line 9-9.
Figure 10:
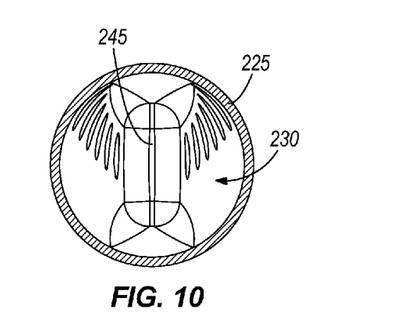
FIG. 10 is a section view of the inlet tube of FIG. 8 along line 10-10.
Figure 11:
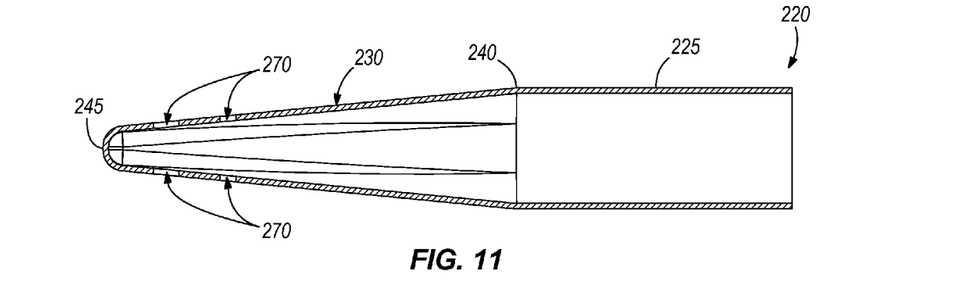
FIG. 11 is a section view of the inlet tube of FIG. 8 along line 11-11.
Figure 12:
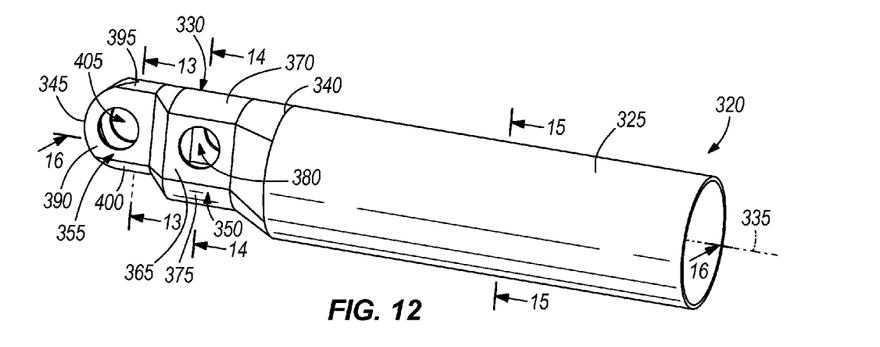
FIG. 12 is a perspective view of a third embodiment of an inlet tube for use with the low NO$_x$ burner of FIG. 1.

Three alternative embodiments of an inlet tube 220, 320, and 420 of the inlet tube 120 are shown in FIGS. 8-17. FIGS. 8-11 show an inlet tube 220 including a cylindrical portion 225, a tip 230 at one end of the cylindrical portion 225, and a longitudinal axis 235. The end of the cylindrical portion 225 opposite the tip 230 is open to receive the fuel/air mixture. The tip 230 narrows from a proximal end 240 adjacent to the cylindrical portion 225 to a distal end 245. The tip 230 is longer than the cylindrical portion 225 when measured along the longitudinal axis 235. The distal end 245 is closed so that the fuel/air mixture flowing through the inlet tube 220 does not exit the inlet tube 220 in a direction parallel to the longitudinal axis 235. As shown in FIG. 10, the cylindrical portion 225 has a circular cross section. As shown in FIG. 9, the tip 230 has a non-circular cross section that is defined by two curved long sides 250 and 255 and two curved short sides 260 and 265. The cross-sectional area of the tip 230 decreases in size from the proximal end 240 to the distal end 245. Six openings 270 are formed through the long side 250 and six openings 200 are formed through the long side 255. The openings 270 through each long side 180 and 185 are positioned in a row. Each row is positioned along a line defined by the center points of the openings 270. Each of these lines is included in a plane that is angled with respect to the longitudinal axis 235. The size, shape, positioning, and number of the openings 270 can vary. The fuel/air mixture flowing through the inlet tube 220 exits through the openings 270. The openings 270 are illustrated as circular holes but can be of any desired shape, including, but not limited to, non-circular holes and elongated slots. For a low $NO_x$ burner 100 using the inlet tube 220, the size and shape of the channel 137 and stop 141 of the inner burner 105 are modified from what is shown in FIG. 3 to correspond to inlet tube 220. Alternatively, the inlet tube 220 includes locating flanges 165 in a manner similar to the inlet tube 120.

Figure 13:
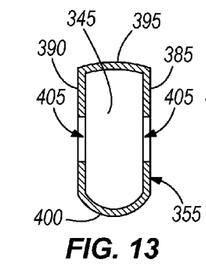
FIG. 13 is a section view of the inlet tube of FIG. 12 along line 13-13.
Figure 14:
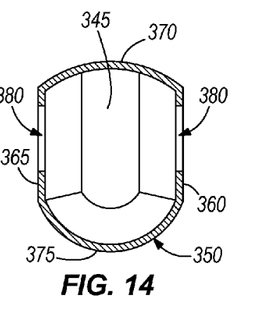
FIG. 14 is a section view of the inlet tube of FIG. 12 along line 14-14.
Figure 15:
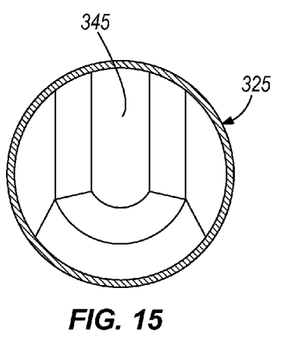
FIG. 15 is a section view of the inlet tube of FIG. 12 along line 15-15.
Figure 16:
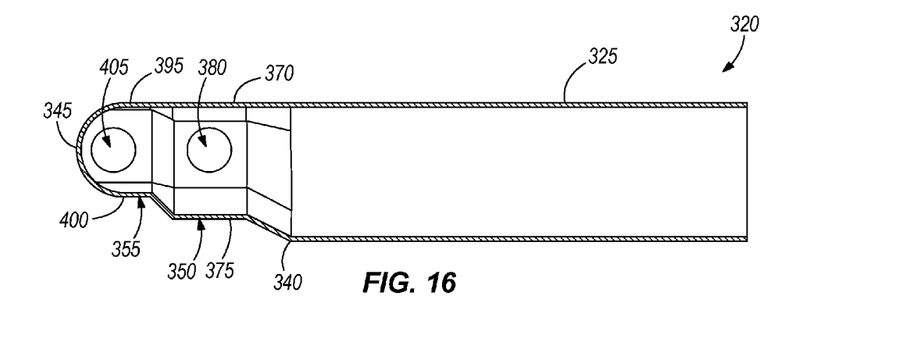
FIG. 16 is a section view of the inlet tube of FIG. 12 along line 16-16.

FIGS. 12-16 show an inlet tube 320 including a cylindrical portion 325, a tip 330 at one end of the cylindrical portion 325, and a longitudinal axis 335. The end of the cylindrical portion 325 opposite the tip 330 is open to receive the fuel/air mixture. The tip 230 narrows from a proximal end 340 adjacent to the cylindrical portion 325 to a first stepped portion 350 and narrows again from the first stepped portion 350 to a second stepped portion 355 that includes a distal end 345 of the tip 330. The tip 330 is shorter than the cylindrical portion 325 when measured along the longitudinal axis 335. The distal end 345 is closed so that the fuel/air mixture flowing through the inlet tube 320 does not exit the inlet tube 320 in a direction parallel to the longitudinal axis 335. As shown in FIG. 15, the cylindrical portion 325 has a circular cross section. As shown in FIG. 14, the first stepped portion 350 has a non-circular cross section that is defined by two flat sides 360 and 365 and two curved sides 370 and 375. The flat sides 360 and 365 each define a plane that is parallel to the longitudinal axis 335. An opening 380 is formed through the flat side 360 and an opening 380 is formed through the flat side 365. The cross-sectional area of the tip 330 decreases from the proximal end 340 to the end of the first stepped portion 350 closest to the cylindrical portion 325. The cross-sectional area of the first stepped portion 350 is constant. The cross-sectional area of the tip 330 decreases from the end of the first stepped portion 350 furthest from the cylindrical portion 325 to the end of the second stepped portion 355 closest to the cylindrical portion 325. As shown in FIG. 13, the second stepped portion 355 has a non-circular cross section that is defined by two flat sides 385 and 390 and two curved sides 395 and 400. The flat sides 385 and 390 each define a plane that is parallel to the longitudinal axis 335. An opening 405 is formed through the flat side 385 and an opening 405 is formed through the flat side 390. The size, shape, positioning, and number of the openings 380 and 405 can vary. The fuel/air mixture flowing through the inlet tube 320 exits through the openings 380 and 405. The openings 380 and 405 are illustrated as circular holes but can be of any desired shape, including, but not limited to, non-circular holes and elongated slots. For a low $NO_x$ burner 100 using the inlet tube 320, the size and shape of the channel 137 and stop 141 of the inner burner 105 are modified from what is shown in FIG. 3 to correspond to inlet tube 320. Alternatively, the inlet tube 320 includes locating flanges 165 in a manner similar to the inlet tube 120.

Figure 17:
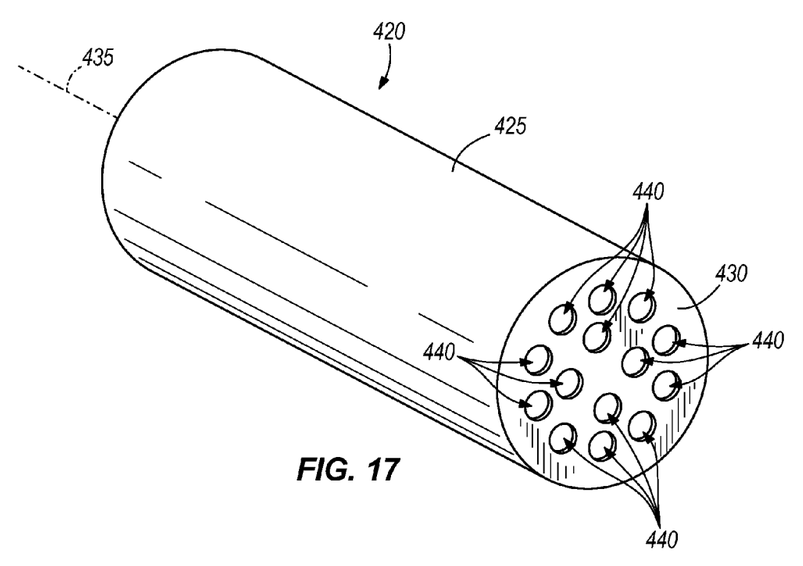
FIG. 17 is a perspective view of a fourth embodiment of an inlet tube for use with the low NO$_x$ burner of FIG. 1.

FIG. 17 shows an inlet tube 420 including a cylindrical portion 425, a wall 430 at one end of the cylindrical portion 425, and a longitudinal axis 435. The wall 430 is flat and defines a plane perpendicular to the longitudinal axis 435. The end of the cylindrical portion 425 opposite the wall 430 is open to receive the fuel/air mixture. Fourteen openings 440 are formed through the wall 430. The openings 440 allow the fuel/air mixture flowing through the inlet tube 420 to exit the inlet tube 420 in a direction parallel to the longitudinal axis 435. The size, shape, positioning, and number of the openings 440 can vary. The openings 440 are illustrated as circular holes but can be of any desired shape, including, but not limited to, non-circular holes and elongated slots. For a low $NO_x$ burner 100 using the inlet tube 420, the size and shape of the channel 137 of the inner burner 105 is modified from what is shown in FIG. 3 to correspond to the inlet tube 420. The channel 137 cannot include a stop 141 that covers the openings 440 because the fuel/air mixture must be able to exit the inlet tube 420 through the openings 440. Alternatively, the inlet tube 420 includes locating flanges 165 in a manner similar to the inlet tube 120.

In use, a fuel-rich fuel/air mixture is supplied to the inlet 140 and a fuel-lean fuel/air mixture is supplied to the inlet 125. The fuel can be natural gas, propane, kerosene, methane, or another fuel suitable for combustion. The fuel-rich mixture is ignited at the outer burner ports 150 to form a series of fuel-rich flames. The fuel-rich flames burn at a relatively low temperature compared to stoichiometric flames, thereby reducing the amount of $NO_x$ caused by the fuel-rich combustion relative to stoichiometric combustion. The fuel-lean mixture is ignited at the inner burner ports 135 to form a series of fuel-lean flames. The fuel-lean flames burn at a relatively low temperature compared to stoichiometric flames, thereby reducing the amount of $NO_x$ caused by the fuel-lean combustion relative to stoichiometric combustion. Additionally, the fuel-rich flames and the fuel-lean flames interact to form an overall flame that results in a reduced burner noise level as compared to a burner with stoichiometric flames. Alternatively, a fuel-lean fuel/air mixture is supplied to the inlet 140 and a fuel-rich fuel/air mixture is supplied to the inlet 125.

Using different inlet tubes 120, 220, 320, and 420 with the low $NO_x$ burner 100 allows the low $NO_x$ burner 100 to be modified quickly for different applications or combustion characteristics. A "different" inlet tube 120, 220, 320, and 420 can be a different embodiment of the inlet tube 120, 220, 320, and 420 or can be a variation of the same inlet tube 120, 220, 320, and 420. For example, an inlet tube 120 including eight openings 200 through each long side 180 and 185 of the tip 160 is a different inlet tube than an inlet tube 120 including six openings 200 through each long side 180 and 185 of the tip 160. Each inlet tube 120, 220, 320, and 420 causes a restriction in the flow path. Changing from one inlet tube 120, 220, 320, and 420 to a different inlet tube 120, 220, 320, and 420 changes the restriction. Changes in the restriction change the rate at which the fuel/air mixture is supplied to the burner ports 150 and also change the volume of fuel/air mixture supplied to the burner ports 150. Therefore, a user is able to adjust the rate and the volume of the fuel-rich fuel/air mixture supplied to the burner ports 150 relative to the rate and the volume of the fuel-lean fuel/air mixture supplied to the burner ports 135 by changing the inlet tube 120, 220, 320, and 420.

The low $NO_x$ burner 100 allows the user to easily adjust the balance of the fuel-rich mixture relative to the fuel-lean mixture in order to achieve a desired result by using a different inlet tube 120, 220, 320, and 420. Desired results can include, for example, lower $NO_x$ or CO emissions, optimizing the burner 100 for use with a specific fuel, and optimizing the burner 100 for use at a specific elevation. For example, under current California regulations, a burner for a residential type, natural gas-fired water heater is considered to be low $NO_x$ when $NO_x$ emissions are less than or equal to forty nanograms per joule of heat output. The adjustability of the low $NO_x$ burner 100 provides for advantages for design, testing, tooling, and manufacturing. These advantages include savings in development, tooling costs, and manufacturing costs as compared with other lean-rich dual burner assemblies.

For the design and prototype testing processes, rather than needing to manufacture a new burner in order to make adjustments to the relative balance between the fuel-rich mixture and the fuel-lean mixture, the user only needs to use a different inlet tube 120, 220, 320, and 420 or modify an inlet tube 120, 220, 320, and 420 for the low $NO_x$ burner 100. This makes the low $NO_x$ burner 100 much more convenient for prototyping and testing as compared with other lean-rich dual burner assemblies.

For the tooling and manufacturing processes, the low $NO_x$ burner 100 provides increased manufacturing flexibility that can reduce the amount of tooling necessary to manufacture a low $NO_x$ burner 100. A low $NO_x$ burner 100 can be manufactured for a specific end use by inserting an inlet tube 120, 220, 320, and 420 for that end use into a burner body 152. Rather than needing to manufacture a variety of burners for a variety of end uses, the manufacturer is able to manufacture a variety of different inlet tubes 120, 220, 320, and 420 for a variety of end uses and a common burner body 152.

Alternatively, a removable baffle is used with the low $NO_x$ burner 100 instead of a removable inlet tube 120, 220, 320, and 420. Different removable baffles are configured to create different restrictions in the inlet 140, thereby providing adjustability of the fuel-rich mixture relative to the fuel-lean mixture similar to that provided by the use of different inlet tubes 120, 220, 320, and 420.

Figure 18:
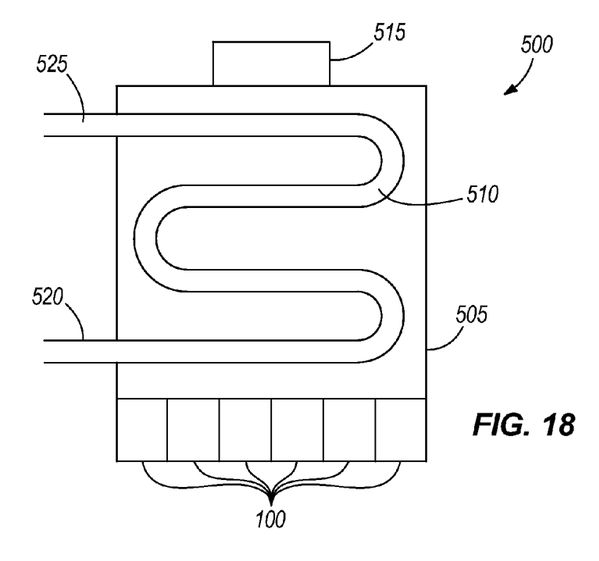
FIG. 18 is a schematic view of a tankless gas-fired water heater including multiple low NO$_x$ burners of FIG. 1.

In a preferred use, the low $NO_x$ burner 100 is used as a component of a tankless gas-fired water heater 500, for example a high input (e.g. 199,000 BTU/hr or above) gas-fired tankless water heater. As shown in FIG. 18, the water heater 500 includes multiple low $NO_x$ burners 100, a heat exchanger 505 with a water conduit 510, and an exhaust hood 515. The low $NO_x$ burners 100 are connected to a source of fuel and a source of air. The source of air could be the atmosphere near the water heater 500. A cold water supply pipe 520 is connected to an end of the water conduit 510 and a hot water supply pipe 525 is connected to the other end of the water conduit 510. The low $NO_x$ burners 100 are fluidly connected to the heat exchanger 505 and the exhaust hood 515.

In use, fuel and air are supplied to the low $NO_x$ burners 100 and combusted as described above to create products of combustion. Cold water is supplied to the water conduit 510 via the cold water supply pipe 520. The products of combustion flow through the heat exchanger 505 and are placed in a heat exchange relationship with the water flowing through the water conduit 510 so that heat is transferred from the products of combustion to the water. The heated water is supplied to the hot water supply pipe 525 for use at an end location, for example, a water faucet. The products of combustion flow out of the heat exchanger 505 to the exhaust hood 515 and are eventually vented to atmosphere.

Various features of the invention are set forth in the following claims.

What is claimed is:

1. A low $NO_x$ burner comprising:
   a body including a plurality of first burner ports connected to a first burner inlet and a plurality of second burner ports connected to a second burner inlet; and
   a removable inlet tube positioned in the second burner inlet to provide a fuel/air mixture to the second burner ports; wherein the inlet tube includes a cylindrical portion, a tip, and a longitudinal axis, the tip extending from an end of the cylindrical portion, the tip including a closed distal end and a plurality of openings, the openings positioned along a line included in a plane parallel to the longitudinal axis.

2. The low $NO_x$ burner of claim 1 wherein the second burner ports are positioned to the outside of the first burner ports.

3. A tankless gas-fired water heater comprising:
a burner including a body with an inner burner having a first burner inlet and an outer burner having a second burner inlet and a removable inlet tube positioned in one of the first burner inlet and the second burner inlet, the removable inlet tube having an arrangement of openings to provide a desired fuel/air mixture to the respective inner burner and outer burner, the burner having an input of greater than 199,000 BTU per hour and operable to generate products of combustion having desired characteristics resulting at least in part from the removable inlet tube utilized;
a heat exchanger for receiving the products of combustion from the burner; and
a water conduit positioned in the heat exchanger in a heat exchange relationship with the products of combustion;
wherein the removable inlet tube includes a cylindrical portion, a tip, and a longitudinal axis, the tip extending from an end of the cylindrical portion, the tip including a closed distal end and a plurality of openings, the openings positioned along a line included in a plane parallel to the longitudinal axis.

4. The tankless gas-fired water heater of claim 3, wherein the desired characteristics include $NO_x$ emissions less than or equal to forty nanograms per joule of heat output.

* * * * *